Feb. 22, 1949.  E. R. ZIEGLER  2,462,249
ELECTRIC MOTOR CONTROL SYSTEM
Original Filed March 20, 1947
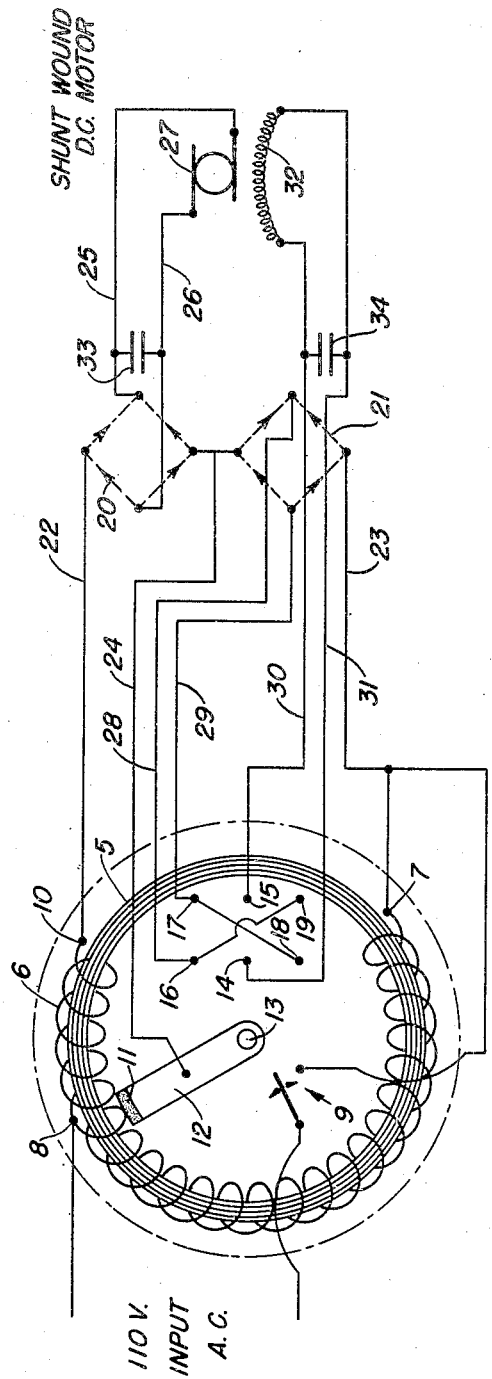
INVENTOR.
EUGENE R. ZIEGLER
BY
ATTORNEY Patented Feb. 22, 1949

2,462,249

UNITED STATES PATENT OFFICE 2,462,249

ELECTRIC MOTOR CONTROL SYSTEM

Eugene R. Ziegler, Spencerport, N. Y., assignor to Ritter Company, Inc., Rochester, N. Y., a corporation of Delaware Original application March 20, 1947, Serial No. 736,031. Divided and this application April 30, 1948, Serial No. 24,193

10 Claims. (Cl. 318—263)

This invention relates to a system for transforming, rectifying and controlling the transmission of electrical power from an alternating current circuit to a direct current apparatus such, for example, as the shunt wound motors commonly employed in dental engines and for driving chucks, rotary tools and the like, one object of the invention being to provide an improved system of the above character having a more simple, economical and efficient construction and mode of operation.

Another object is the provision of a system of the character described for controlling the speed of the driven motor by varying the ratios in which the current is transformed, rectified and supplied to the armature and fields of windings of the motor, respectively, without the use of resistors heretofore commonly employed for controlling the supply of current to such windings.

A further object is to provide an apparatus having the above advantages, with but a single control member between the alternating current circuit and the direct current machine, for controlling the speed of the latter by the adjustment of continuously variable transformer means.

To these and other ends the invention resides in certain improvements and combinations of parts, all as will be hereinafter more fully described, the novel features being pointed out in the claims at the end of the specification.

In the drawings:

The figure is a diagrammatic view of an electrical circuit system embodying the present system.

The invention is embodied in a system comprising variable transformer and rectifier means, for applying the impressed voltage with inversely varying ratios to a pair of bridge-type rectifiers of known type, one of which is connected to the armature winding and the other to the field winding of the driven motor, preferably with means for reversing the direction of the current supplied to one of said motor windings to reverse its direction of operation.

The transformer means may be of any known and suitable type comprising a pair of fixed secondary terminals and a terminal movable in contact with the secondary winding from one of said terminals to the other, to vary the ratio of transformation. Such transformer means, in the present instance, is preferably of the toroidal, auto-transformer type shown in the drawings, comprising a ring shaped core 5 on which is a single winding comprising conducting coils 6 forming an arcuate series of stationary contacts, as well understood in the art. The coil is provided with primary terminals 7 and 8 connected to the opposite sides of an alternating current input line of, say, 110 volts, as shown. This input line preferably includes a switch, indicated generally at 9, for disconnecting the system from the line. The primary terminal 7 serves also as one of the secondary terminals, the other of which is shown at 10. To provide for connection with points of the transformer winding of varying potential, the controlling means comprises, intermediate the stationary secondary terminals described above, an adjustable, secondary terminal in the form of a movable contact plug or wiper 11, made of carbon or other suitable material, fixed on one end of an arm 12 having its other end pivoted at 13, concentrically with the arcuate series of stationary contacts provided by the coils of the transformer winding, as shown. The wiper contact 11 is preferably wide enough to bridge from one coil contact to the other, as shown, to maintain a continuous connection, and suitable means are provided for swinging the arm 12 to move its contact 11 along the coils of the winding, to continuously vary the ratio of transformation and the current supplied to the direct current apparatus to be controlled, as hereafter more fully described.

Switch means are provided, preferably in association with the above described transformer and its control arm 12, for reversing the direction of the direct current supplied to one of the windings of the driven apparatus, such switch means being shown schematically in the present instance as comprising contacts 14 and 15 adapted to be connected by movable switch blades or the like with contacts 16 and 17, or with reversely arranged opposing contacts 18 and 19, as shown, the contacts 14 and 15 being connected with one of the windings of the driven apparatus and the contacts 16 and 17 with the rectifying means, as hereafter described. The above described transformer controlling means and reversing switch, as well as the main switch for connecting the system with the input line, are preferably combined in a controller unit with a single operating member or lever such as described and claimed in my copending patent application, Serial No. 736,031, filed March 20, 1947, Electric power transforming rectifying and controlling apparatus, of which the present application is a division.

The above described transformer controller and switch means are employed in combination with a pair of bridge-type rectifiers, of known character, indicated schematically at 20 and 21 in the drawing of the circuit diagram. One terminal of each of these rectifiers is connected, as at 22 and 23, to one of the end terminals of the transformer winding and the other or opposite terminals of the rectifiers are together connected, as at 24, with the movable transformer contact 11, so as to continuously increase the current supplied to the rectifier 20 and decrease the current supplied to the rectifier 21 as the control lever 12 is moved along the transformer winding. Rectifier 20 has its direct current terminals connected, as at 25 and 26, in circuit with the armature winding of a shunt wound, direct current motor 27 to be driven, while the direct current terminals of rectifier 21 are connected, as at 28 and 29, with the pairs of reversed terminals 16 and 17 and 18 and 19. Terminals 14 and 15 of the switch are connected, as at 30 and 31, with the field winding 32 of the motor, to reverse the current supplied thereto and the direction of rotation of the motor. D. C. capacitors, of the electrolytic type, are preferably connected across the armature circuit of the driven motor, as at 33 and, across its field circuit, as at 34, respectively, to control ripple and improve operation.

In operation, the main switch 9 is closed to connect the system with the alternating current input line, the reversing switch is positioned for rotating the driven motor in the desired direction and the transformer contact 11 is moved, as desired, to continuously and progressively increase the direct current supplied to the armature winding of the motor and decrease the direct current supplied to its field winding, so as to accelerate the motor to the desired speed of operation. The return of the transformer contact 11 to starting position correspondingly reduces the motor speed. By moving the reversing switch to its opposite position, the direction of current through the field winding of the motor is reversed to drive it in the opposite direction under similar control by the movable transformer contact.

It is evident from the above description that the invention provides an exceedingly simple and efficient controlling system in which the speed of the driven machine is continuously variable by varying the ratio of the currents transformed, rectified and applied to the windings of the driven apparatus, thereby eliminating the need for resistor, thyratron, or other more complicated control means, as well as the attendant wastage of power. Such improved control, furthermore, requires only a single control member between the alternating current input and the direct current circuits of the apparatus to be driven, in addition to the main and reversing switches, for effectively, economically and conveniently controlling the speed and direction of rotation of the driven apparatus.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. The combination of an alternating current circuit including a transformer having a winding provided with a pair of spaced secondary terminals and with a movable secondary terminal intermediate said spaced terminals, a direct current machine having armature and field windings, a pair of rectifiers for supplying current to said armature and field windings, respectively, each of said rectifiers being connected to one of said spaced terminals and to said movable terminal, and a control member for moving said movable terminal along and in contact with said winding from one toward the other of said secondary terminals thereof, to vary the ratio of currents supplied to said rectifiers and to the windings of said machine, for controlling the operation thereof.

2. The combination of an alternating current circuit including a transformer having a winding provided with a pair of spaced secondary terminals and a movable secondary terminal intermediate said spaced terminals, a direct current machine having armature and field windings, a pair of rectifiers for supplying current to said armature and field windings, respectively, each of said rectifiers being connected to one of said spaced terminals and to said movable terminal, a switch for reversing the direction of the current supplied to one of said machine windings, and a control member having actuating connections with said movable terminal and switch for controlling the direction of rotation of said machine and for moving said movable terminal along and in contact with said winding from one toward the other of said secondary terminals thereof, for varying the ratio of the currents supplied to said rectifiers and to said machine windings, for controlling the speed of operation of said machine.

3. The combination of an alternating current circuit including a transformer having a winding provided with secondary terminals and with a contact movable to engage said winding at a variable point between the said terminals, a direct current machine having armature and field windings, and a pair of bridge-type rectifiers each having one of its alternating current terminals connected to one of said secondary terminals, the other alternating current terminals of said rectifiers being connected to said movable contact, said rectifiers having their secondary terminals connected to the terminals of said armature and field windings, respectively, and said contact being movable to vary the ratio between the currents supplied to said windings of said machine, to control the operation thereof.

4. The combination of an alternating current circuit including a transformer having a winding provided with secondary terminals and with a contact movable to engage said winding at a variable point between the said terminals, a direct current machine having armature and field windings, a pair of bridge-type rectifiers each having one of its alternating current terminals connected to one of said secondary terminals, the other alternating current terminals of said rectifiers being connected to said movable contact, said rectifiers having their secondary terminals connected to the terminals of said armature and field windings, respectively, said contact being movable to vary the ratio between the currents supplied to said machine windings, and means for reversing the connections between one of said rectifiers and one of the windings of said machine, to reverse the operation thereof.

5. The combination of an alternating current circuit including a transformer having a winding provided with secondary terminals and with a contact movable in continuous engagement with said winding to various points thereof between said terminals, a direct current machine having armature and field windings, and a pair of bridge-type rectifiers each having one of its alternating current terminals connected to one of said secondary terminals, the other alternating current terminals of said rectifiers being connected to said movable contact, said rectifiers having their secondary terminals connected to the terminals of said armature and field windings, respectively, said contact being movable to continuously vary the ratio between the currents supplied to said windings of said machine, to control the operation thereof.

6. The combination of an alternating current circuit including a transformer having a toroidal winding provided with secondary terminals and with a contact rotatably mounted for engagement with said winding at a variable point between said terminals, a direct current machine having armature and field windings, and a pair of bridge-type rectifiers each having one of its alternating current terminals connected to one of said secondary terminals, the other alternating current terminals of said rectifiers being connected to said rotatable contact, said rectifiers having their secondary terminals connected to the terminals of said armature and field windings, respectively, said contact being rotatable to different points of engagement with said winding to vary the ratio between the currents supplied to said windings of said machine, to control the operation thereof.

7. The combination of an alternating current circuit including a transformer having a winding provided with secondary terminals and with a contact movable to engage said winding at a variable point between said terminals, a direct current machine having armature and field windings, a pair of bridge-type rectifiers each having one of its alternating current terminals connected to one of said secondary terminals, the other alternating current terminals of said rectifiers being connected to said movable contact, said rectifiers having their secondary terminals connected to the terminals of said armature and field windings, respectively, a control member movable in opposite directions from an intermediate neutral position, and a connection between said member and contact for moving said contact in the same direction during movement of said member in either of said opposite directions.

8. The combination of an alternating current circuit including a transformer having a winding provided with secondary terminals, a contact movable to engage said winding at a variable point between said terminals, and a switch in said circuit, a direct current machine having armature and field windings, a pair of bridge-type rectifiers each having one of its alternating current terminals connected to one of said secondary terminals, the other alternating current terminals of said rectifiers being connected to said movable contact, said rectifiers having their secondary terminals connected to the terminals of said armature and field windings, respectively, and a control member movable in opposite directions from an intermediate position and provided with means for closing said switch and for moving said contact in the same direction during movement of said member in either of said opposite directions, for starting and controlling the operation of said machine.

9. The combination of an alternating current circuit including a transformer having a winding provided with secondary terminals, a contact movable to engage said winding at a variable point between said terminals, and a main switch controlling said circuit, a direct current machine having armature and field windings, a pair of bridge-type rectifiers each having one of its alternating current terminals connected to one of said secondary terminals, the other alternating current terminals of said rectifiers being connected to said movable contact, said rectifiers having their secondary terminals connected to the terminals of said armature and field windings, respectively, a switch for reversing the current supplied by the secondary terminals of one of said rectifiers, and a control member movable in opposite directions from an intermediate neutral position and provided with means for actuating said switches and for moving said contact in the same direction during movement of said member in each of said opposite directions, for starting, reversing and controlling the operation of said machine.

10. The combination of an alternating current circuit including a transformer having a toroidal winding provided with secondary terminals, a contact rotatable concentrically with said winding for engagement with different points thereof between said terminals, a direct current machine having armature and field windings, a pair of bridge-type rectifiers each having one of its alternating current terminals connected to one of said secondary terminals, the other alternating current terminals of said rectifiers being connected to said movable contact, said rectifiers having their secondary terminals connected to the terminals of said armature and field windings, respectively, a switch for reversing the direct current supplied by one of said rectifiers, a control member rotatable concentrically with said winding in opposite directions from an intermediate neutral position, and means connecting said member with said switch and contact for actuating said switch and rotating said contact in the same direction during rotation of said member in each of said opposite directions.

EUGENE R. ZIEGLER.

REFERENCES CITED

The following references are of record in the file of this patent:

UNITED STATES PATENTS

| Number | Name | Date |
|---|---|---|
| 1,655,039 | Alexanderson et al. | Jan. 3, 1928 |
| 2,192,050 | Norcross | Feb. 27, 1940 |